US012603198B2

(12) United States Patent
Fang et al.

(10) Patent No.: US 12,603,198 B2
(45) Date of Patent: Apr. 14, 2026

(54) SURFACE-MOUNTED POLYMER PCT OVERCURRENT PROTECTION ELEMENT HAVING SMALL PACKAGE SIZE

(71) Applicant: SHANGHAI WAYON ELECTRONICS CO., LTD., Shanghai (CN)

(72) Inventors: Yong Fang, Shanghai (CN); Kun Xia, Shanghai (CN); Guochen Wu, Shanghai (CN); Yang Zhou, Shanghai (CN); Xiaoxu Hou, Shanghai (CN); Wei Zhang, Shanghai (CN)

(73) Assignee: SHANGHAI WAYON ELECTRONICS CO., LTD., Shanghai City (CN)

( * ) Notice: Subject to any disclaimer, the term of this patent is extended or adjusted under 35 U.S.C. 154(b) by 567 days.

(21) Appl. No.: 18/010,542

(22) PCT Filed: Jan. 15, 2021

(86) PCT No.: PCT/CN2021/072157
§ 371 (c)(1),
(2) Date: Dec. 15, 2022

(87) PCT Pub. No.: WO2021/253822
PCT Pub. Date: Dec. 23, 2021

(65) Prior Publication Data
US 2023/0245802 A1     Aug. 3, 2023

(30) Foreign Application Priority Data

Jun. 17, 2020     (CN) ......................... 202010553726.3

(51) Int. Cl.
H01C 1/14          (2006.01)
H01C 7/02          (2006.01)
(Continued)

(52) U.S. Cl.
CPC ........... *H01C 1/1406* (2013.01); *H01C 7/021* (2013.01); *H01C 7/028* (2013.01); *H01C 7/13* (2013.01); *H01C 17/006* (2013.01); *H02H 9/026* (2013.01)

(58) Field of Classification Search
CPC ...... H01C 1/1406; H01C 7/021; H01C 7/028; H01C 7/13; H01C 17/006
See application file for complete search history.

(56) References Cited

U.S. PATENT DOCUMENTS

| | | | | | |
|---|---|---|---|---|---|
| 6,377,467 | B1 * | 4/2002 | Chu | ........................ | H01C 1/032 |
| | | | | | 361/767 |
| 7,119,655 | B2 * | 10/2006 | Starling | ................. | H01C 7/027 |
| | | | | | 338/314 |

(Continued)

FOREIGN PATENT DOCUMENTS

| | | |
|---|---|---|
| CN | 102426888 A | 4/2012 |
| CN | 205069252 U | 3/2016 |

(Continued)

OTHER PUBLICATIONS

International Search Report issued in corresponding international patent application PCT/CN2021/072157 dated Mar. 30, 2021; 4 pages.

*Primary Examiner* — Kyung S Lee
(74) *Attorney, Agent, or Firm* — Kenneth Q. Lao; WARE FRESSOLA MAGUIRE & BARBER LLP

(57) ABSTRACT

A surface-mounted polymer PTC overcurrent protection element having a small package size, comprising a PTC chip, an insulating layer (30), end electrodes (41, 42), and at least one conductive member (60). A dividing gap is designed on a first conductive electrode (21) to form first and second conductive areas (211, 212); the conductive member (60) is arranged at the edge or at least a corner of the first conductive area (211) side of the PTC chip, is used for (Continued)

conducting the first conductive area (211) and a second conductive electrode (22) on the PTC chip, and is not in contact with the end electrodes (41, 42); the main portion comprised in the dividing gap (70) of the first conductive electrode (21) is parallel to the longitudinal direction of the first end electrode (41) and the second end electrode (42).

8 Claims, 4 Drawing Sheets

(51) Int. Cl.
    *H01C 7/13*           (2006.01)
    *H01C 17/00*        (2006.01)
    *H02H 9/02*          (2006.01)

(56)                 References Cited

U.S. PATENT DOCUMENTS 7,173,511 B2 *   2/2007   Han ........................ H01C 1/148
                                                338/28

| | | | |
|---|---|---|---|
| 9,112,348 B2 * | 8/2015 | Tseng | H02H 9/026 |
| 10,056,176 B2 * | 8/2018 | Wang | H01C 7/027 |
| 2003/0227368 A1 * | 12/2003 | Huang | H01C 1/1406 |
| | | | 338/22 R |
| 2003/0227731 A1 * | 12/2003 | Huang | H01C 7/02 |
| | | | 361/103 |
| 2005/0062581 A1 * | 3/2005 | Koyama | G01K 7/22 |
| | | | 374/E7.028 |
| 2014/0118871 A1 * | 5/2014 | Tseng | H01C 7/027 |
| | | | 361/58 |
| 2014/0285938 A1 * | 9/2014 | Tseng | H01C 7/021 |
| | | | 361/93.8 |
| 2018/0033527 A1 * | 2/2018 | Tseng | H01C 1/1406 |
| 2020/0273609 A1 * | 8/2020 | Tseng | H01C 7/13 |

FOREIGN PATENT DOCUMENTS

| | | |
|---|---|---|
| CN | 107665758 A | 2/2018 |
| CN | 110853849 A | 2/2020 |
| CN | 111640548 A | 9/2020 |
| KR | 20060093628 A | 8/2006 |

* cited by examiner

22

50'

22

61

62

SURFACE-MOUNTED POLYMER PCT OVERCURRENT PROTECTION ELEMENT HAVING SMALL PACKAGE SIZE

BACKGROUND OF THE INVENTION

1. Field of the Invention

This invention relates to a surface-mounted polymer PTC (positive temperature coefficient) overcurrent protection element having a small package size.

2. Description of the Related Art

Overcurrent protection components are used in electronic circuits to protect electronic circuits from malfunctioning or even burning due to overheating or overcurrent. The core component of the overcurrent protection element is a chip formed by the core material of the polymer conductive composite material and the conductive electrodes covering both sides of the core material. The chip is in a low resistance state at room temperature, and the electronic circuit is in an open state; when the temperature rises or the circuit fails and a large current occurs, its resistance jumps to thousands of times or more to reduce the current in the circuit and protect the circuit effect. When the temperature recovers or the fault current is removed, the resistance of the PTC chip returns to normal. In order to achieve repeated use, it is a resettable fuse PTC.

Presently, electronic products are becoming more functional and thinner, and electronic circuits are becoming more and more complex. The application of overcurrent protection components tends to be miniaturized, smaller and thinner. Conventional 1206, 0805 and other package sizes are quite mature in technology and have been widely used. And 0402, even 0201, and even 01005 packaging requirements are gradually emerging corresponding to market demand. Such miniaturized products will be a huge technical challenge to the process capability and circuit design of PCB processing.

SUMMARY OF THE INVENTION

An object of the present invention is to provide a surface-mounted polymer PTC overcurrent protection element having a small package size, which has a miniaturized overcurrent protection element that can be mass produced and improves the effective area and current capacity of the PTC while being miniaturized.

Another object of the present invention is to provide a preparation method for the surface-mounted polymer PTC overcurrent protection element having the small package size.

The object of the present invention is achieved through the following scheme: a surface-mounted polymer PTC overcurrent protection element having a small package size, comprising a PTC chip, an insulating layer, end electrode (terminal electrode), and at least one conductive member. A dividing gap is designed on a first conductive electrode to form first and second conductive areas; the conductive member is arranged at the edge or at least a corner of the first conductive area side of the PTC chip, is used for conducting the first conductive area and a second conductive electrode on the PTC chip, and is not in contact with the end electrodes; the main portion comprised in the dividing gap is parallel to the longitudinal direction of the first end electrode and the second end electrode.

The present invention is different from the design of the conventional surface-mounted PTC which has through holes at both the ends. Through special design, a conductive member is arranged at one end edge or at least a corner of the PTC chip to connect the conductive electrodes on both sides of the PTC core material. A dividing gap is designed on a first conductive electrode, so that the miniaturized overcurrent protection element can satisfy the current PCB process to achieve requirements of mass production. It is convenient to design an overcurrent protection element resistance scheme, and reduce adjustment of a PTC core material formulation.

Specifically, the present invention provides a surface-mounted polymer PTC overcurrent protection element having a small package size, comprising a PTC chip, an insulating layer, end electrodes, and at least one conductive member.

1) The PTC chip is composed of a PTC core material, a first conductive electrode covering the first surface of the PTC core material, and a second conductive electrode covering the second surface of the PTC core material. The first conductive electrode is divided by a dividing gap to form first and second conductive areas.

2) At least one conductive member is located at the edge of the PTC chip, is used for conducting the first conductive area and the second conductive electrode of the first conductive electrode on the PTC chip, and is not in contact with the end electrodes.

3) The insulating layer is arranged between the first conductive electrode and the layer of the first and second end electrodes for electrical isolation. The first conductive hole passes through the insulating layer and connects with the first conductive area on the first conductive electrode. The second conductive hole passes through the insulating layer and connects with the second conductive area on the first conductive electrode.

4) The main portion in the dividing gap is parallel to the longitudinal direction of the first end electrode and the second end electrode.

5) The end electrodes include the first end electrode and the second end electrode. The first end electrode is located at one end of the surface of the insulating layer, is electrically connected to the first conductive area through the first conductive hole and used as pad. The second end electrode is located at the other end of the surface of the insulating layer, is electrically connected to the second conductive area through the second conductive hole and used as pad. It's to avoid the bonding strength between the first conductive electrode and the PTC core material from being weakened or even separation of the first conductive electrode and PTC core material.

In addition to the above, the area of the first conductive area and the second conductive area are adjusted and set by the relative position of the dividing gap on the first conductive electrode, and the effective area of the PTC core material is determined by the area of the second conductive area.

In addition to the above, the dividing gap is filled with resin material of the insulating layer.

Further, the dividing gap is rectangular, triangular, arcuate, elliptical, polygonal, or a combination of the above.

In addition to the above, insulating reinforcements are arranged at four corners, one end edge, two end edges or four end edges of the PTC chip to reinforce the element.

In addition to the above, the PTC overcurrent protection element is a single-side-soldering surface-mounted element.

Further, the outermost layer of the non-soldering side of the element is covered by insulating layers, metal foil layers or any combination of insulating layers and metal foil layers to reinforce structural strength of the element.

The present invention also provides a preparation method of the surface-mounted polymer PTC overcurrent protection element having a small package size, comprising the following steps:

Step 1, the preparation of PTC chip: mixing the high polymer that is the component of conductive polymer composite base layers and conductive filler in a high-speed mixer, then mixing the mixture at 100-200° C., and then using extrusion or compression molding to make a composite material base layer with an area of 100~5000 cm² and a thickness of 0.1~3.0 mm; pressing the first and second conductive electrodes on the first and second surfaces of the composite material base layer respectively by hot pressing to make a composite material sheet, processing the composite material sheet by γ-ray (Co60) or electron beam irradiation crosslinking with 2~100 Mrad dose, and then cutting the composite material sheet to get a rectangular PTC chip;

Step 2, etching or cutting a dividing gap on a first conductive electrode and filling the dividing gap with insulating material to form first and second conductive areas; the area of the first conductive area is larger than the area of the second conductive area and determined according to the resistance value requirement of the PTC chip;

Step 3, etching a groove and plating a metal conductive member at one end edge or the corner of the first conductive area of the PTC chip to conduct the first conductive area of the first conductive electrode and the second conductive electrode;

Step 4, covering a insulating layer on the first conductive electrode;

Step 5: setting first and second end electrodes in longitudinal parallel and making the main portion of the dividing gap to be parallel to the end electrodes, drilling and electroplating first and second conductive holes on the first and second end electrodes, conducting the first end electrode and the first conductive area through the first conductive hole and using the first end electrode as a pad, conducting the second end electrode and the second conductive area through the second conductive hole and using the second end electrode as a pad.

The beneficial effects of the present invention are:

1. The conductive members are arranged at end edges or corners of the PTC chip to connect the conductive electrodes on both sides of the PTC core material, while the dividing gap is designed on the first conductive electrode, so that the design can be mass-produced in the PCB processing process.

2. The resistance of the overcurrent protection element can be adjusted by design and adjustment of the relative position of the dividing gap on the first conductive electrode to make it more designable.

3. The element of the present invention is a single-side-welding surface-mounted type. The advantages of the single-side-soldering surface-mounted element are: the outermost layer of the non-soldering surface of the element can be covered by insulating layers, metal foil.

4. The circuit design of the present invention is especially suitable for the subminiature surface-mounted PTC manufacturing process.

REFERENCE NUMBERS OF THE DRAWINGS

Figure 7:
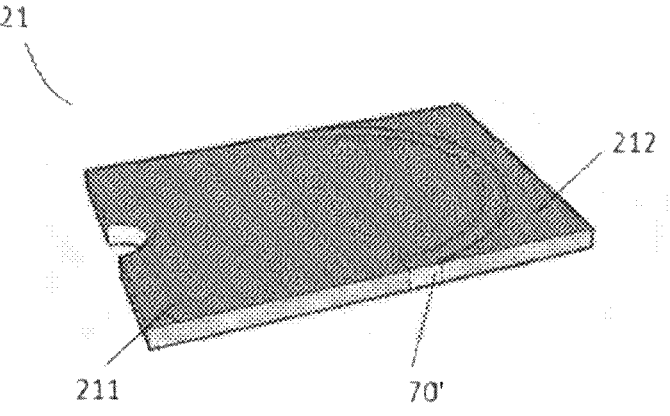
FIG. 7 illustrates the structure diagram of the first conductive electrode of the surface-mounted polymer PTC overcurrent protection element having a small package size in Embodiment 5.

10—the PTC core material;
21, 22—the first and second conductive electrode;
211, 212—the first and second conductive areas of the first conductive electrode;
30—the insulating layer;
41, 42—the first and second end electrodes;
51, 52—the first and second conductive holes;
60, 60'—the conductive members;
61, 62—the first and second conductive members;
70—the dividing gap;
80—the insulating reinforcement;
90—reinforced layer;
In FIG. 7:
21'—the first conductive electrode;
211', 212'—the first and second conductive areas of the first conductive electrode;
70'—the dividing gap.

DETAILED DESCRIPTION OF EMBODIMENTS OF THE INVENTION

The Preparation of Material:

Mixing the high polymer that is the component of conductive polymer composite base layers and conductive filler in a high-speed mixer, then mixing the mixture at 100-200° C., and then using extrusion or compression molding to make a PTC core material 10 with an area of 100~5000 cm² and a thickness of 0.1~3.0 mm; pressing the first and second conductive electrodes 21,22 on the first and second surfaces of the PTC core material 10 respectively by hot pressing to make a composite material sheet, processing the composite material sheet by γ-ray (Co60) or electron beam irradiation crosslinking with 2~100 Mrad dose, and then cutting the composite material sheet to get a rectangular PTC chip.

Embodiment 1

Figure 1:
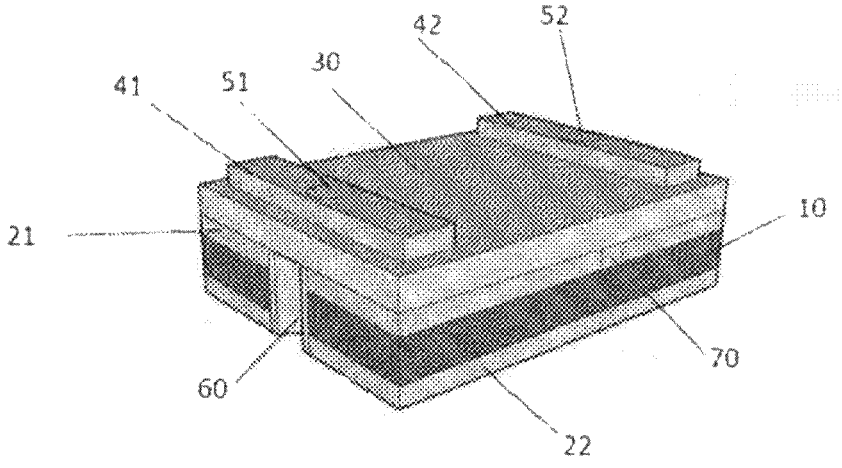
FIG. 1 illustrates the structure diagram of the surface-mounted polymer PTC overcurrent protection element having a small package size in Embodiment 1.
Figure 2:
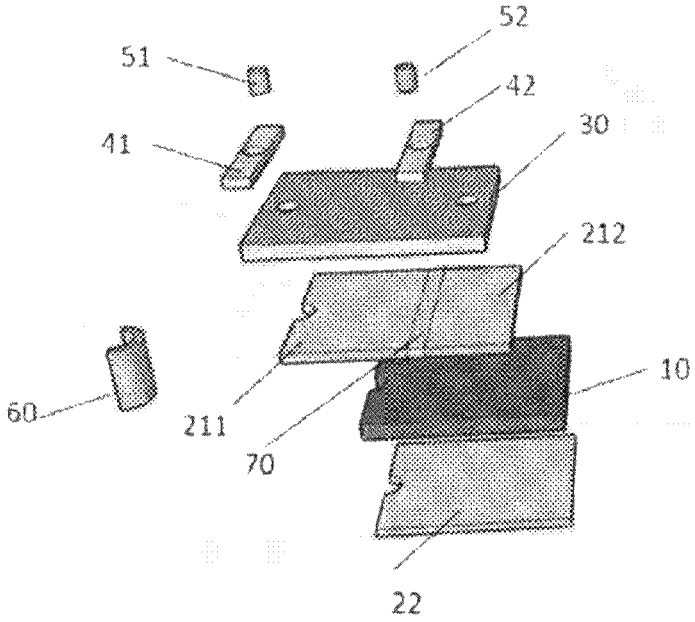
FIG. 2 illustrates the exploded structure diagram of the surface-mounted polymer PTC overcurrent protection element having a small package size in Embodiment 1.

A surface mount polymer PTC overcurrent protection element having a small package size is illustrated in FIG. 1, and FIG. 2 illustrates the exploded structure diagram of the overcurrent protection element in FIG. 1, comprising:

The first and second surfaces of the PTC core material 10 are covered with first and second conductive electrodes 21,22 to compose a PTC chip. A rectangular dividing gap 70 which is parallel to the longitudinal direction of the first and second end electrode 41,42 is etched or cut on the first conductive electrode 21 to form first and second conductive areas 211,212 that are not in electrical connect with each other.

A conductive member 60 is arranged at the end edge of the PTC chip. The conductive member 60 conducts the first conductive area 211 which covers the first surface of the PTC chip and the second conductive electrode 22 which covers the second surface of the PTC chip.

The surface of the first conductive electrode 21 is covered with an insulating layer 30 which electrically isolates the first end electrode 41 with the first conductive area 211 and the second end electrode 42 with the second conductive area 212 on the first conductive electrode 21 respectively.

The first conductive holes 51 passes through the first end electrodes 41 and the insulating layer 30 to be in electrical connect with the first conductive area 211. The second conductive holes 52 passes through the second end electrodes 42 and the insulating layer 30 to be in electrical connect with the second conductive area 212.

In Embodiment 1, using the first and second end electrodes 41,42 which cover the the upper surface of the insulating layer 30 as pads instead of directly using the first and second conductive area 211,212 as pads is to avoid the bonding strength between the first conductive electrode 21 and the PTC core material 10 from being weakened or even separation of the first conductive electrode and PTC core material while using the first and second conductive area 211,212 as pads during reflow soldering process.

In Embodiment 1, preparation is according to the following steps:

Step 1, the preparation of PTC chip: mixing the high polymer that is the component of conductive polymer composite base layers and conductive filler in a high-speed mixer, then mixing the mixture at 100-200° C., and then using extrusion or compression molding to make a PTC core material 10 with an area of 100~5000 cm² and a thickness of 0.1~3.0 mm; pressing the first and second conductive electrodes 21,22 on the first and second surfaces of the PTC core material 10 respectively by hot pressing to make a composite material sheet, processing the composite material sheet by γ-ray (Co60) or electron beam irradiation cross-linking with 2~100 Mrad dose, and then cutting the composite material sheet to get a rectangular PTC chip.

Step 2, etching or cutting a straight-groove dividing gap 70 on the first conductive electrode 21 to form first and second conductive areas 211,212; the area of the first conductive area 211 is larger than the area of the second conductive area 212 and determined according to the resistance value requirement of the PTC chip;

Step 3, etching an outwards-opening groove and plating a metal conductive member 60 at one end edge of the first conductive area 211 of the PTC chip to conduct the first conductive area 211 and the second conductive electrode 22;

Step 4, covering a insulating layer 30 on the first conductive electrode 21 and filling the dividing gap 70 with insulating material;

Step 5: Setting first and second end electrodes 41,42 in longitudinal parallel and making the dividing gap to be parallel to the first and second end electrodes 41,42 and not to be in contact with the conductive member 60, drilling and electroplating first and second conductive holes 51,52 in the first and second end electrodes 41,42, conducting the first end electrode 41 and the first conductive area 211 through the first conductive hole 51 and using the first end electrode 41 as a pad; conducting the second end electrode 42 and the second conductive area 212 through the second conductive hole 52 and using the second end electrode 41 as a pad.

Embodiment 2

Figure 3:
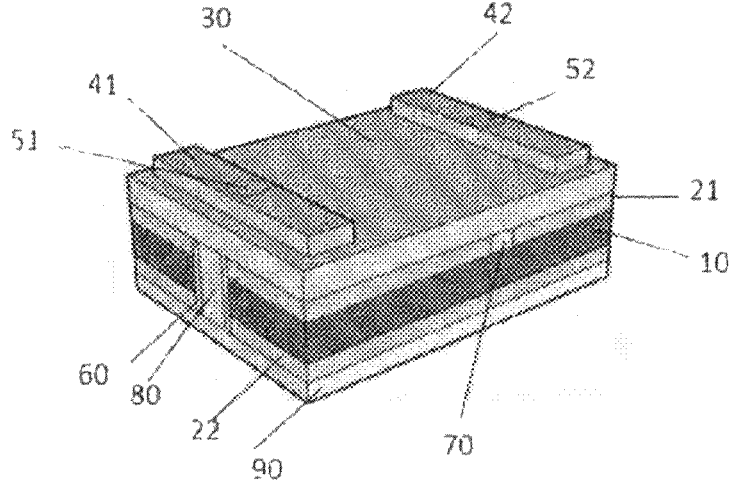
FIG. 3 illustrates the structure diagram of the surface-mounted polymer PTC overcurrent protection element having a small package size in Embodiment 2.

As illustrated in FIG. 3, the surface-mounted polymer PTC overcurrent protection element having a small package size of Embodiment 2 is similar to Embodiment 1. In addition to Embodiment 1, a reinforced layer 90 is covered on the surface of the second conductive electrode 22 of the PTC chip in order to reinforce structural strength of the surface-mounted element, and a insulating reinforcement 80 is put into the conductive member 60 which conduct the first conductive electrode 21 and the second conductive electrode 22 in order to reinforce structural rigidity and strength of the overcurrent protection element, the specific structure is as follows:

The first and second surfaces of the PTC core material 10 are covered with first and second conductive electrodes 21,22 to compose a PTC chip. A rectangular dividing gap 70 which is parallel to the longitudinal direction of the first and second end electrode 41,42 is etched or cut on the first conductive electrode 21 to form first and second conductive areas 211,212 that are not in electrical connect with each other.

A conductive member 60 is arranged at the end edge of the PTC chip. The conductive member 60 conducts the first conductive area 211 which covers the first surface of the PTC chip and the second conductive electrode 22 which covers the second surface of the PTC chip. An insulating reinforcement 80 is put into the conductive member 60.

The surface of the first conductive electrode 21 is covered with an insulating layer 30 which electrically isolates the first end electrode 41 with the first conductive area 211 and the second end electrode 42 with the second conductive area 212 on the first conductive electrode 21 respectively.

The first conductive holes 51 passes through the first end electrodes 41 and the insulating layer 30 to be in electrical connection with the first conductive area 211 to use the first end electrodes 41 as pad. The second conductive holes 52 passes through the second end electrodes 42 and the insulating layer 30 to be in electrical connection with the second conductive area 212 to use the second end electrodes 42 as pad.

The outer surface of the non-soldering side of the second conductive electrode 22 is covered by reinforced layers which may be an insulating layer, metal foil layers or any combination of insulating layers and metal foil layers in order to reinforce structural strength of the element.

In addition to the advantages of the Embodiment 1, the structure of Embodiment 2 is reinforced.

Embodiment 3

Figure 4:
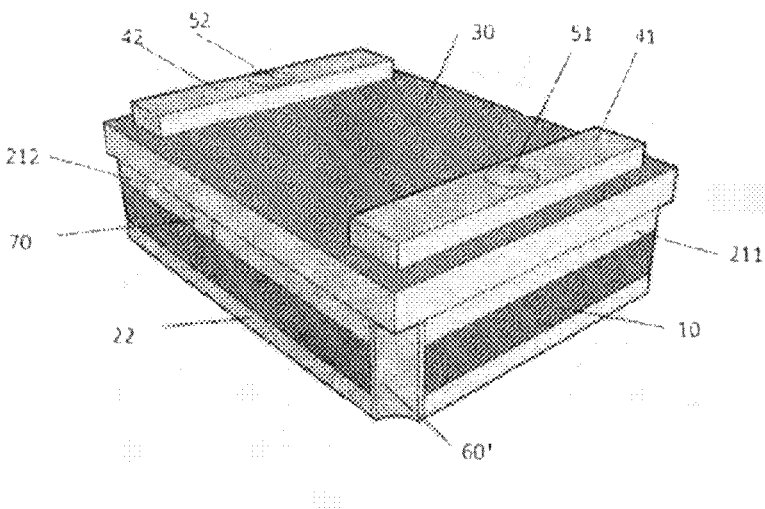
FIG. 4 illustrates the structure diagram of the surface-mounted polymer PTC overcurrent protection element having a small package size in Embodiment 3.
Figure 5:
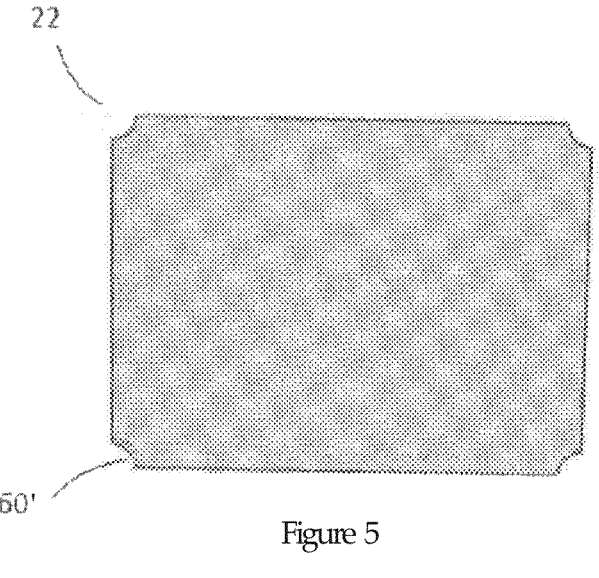
FIG. 5 illustrates the bottom view of the second conductive electrode of the surface-mounted polymer PTC overcurrent protection element having a small package size in Embodiment 3.

As illustrated in FIG. 4, the surface-mounted polymer PTC overcurrent protection element having a small package size of Embodiment 3 is similar to Embodiment 1, and FIG. 5 illustrates the bottom view of the second conductive electrode of the structure diagram in FIG. 4. In addition to Embodiment 1, the conductive member 60' is transferred from the middle of one end edge of the PTC chip to one corner of the end edge of the PTC chip. In addition to Embodiment 2, four corner holes are prepared in four corners of the PTC chip, and four insulating reinforcements are put into the four corner holes.

Embodiment 4

Figure 6:
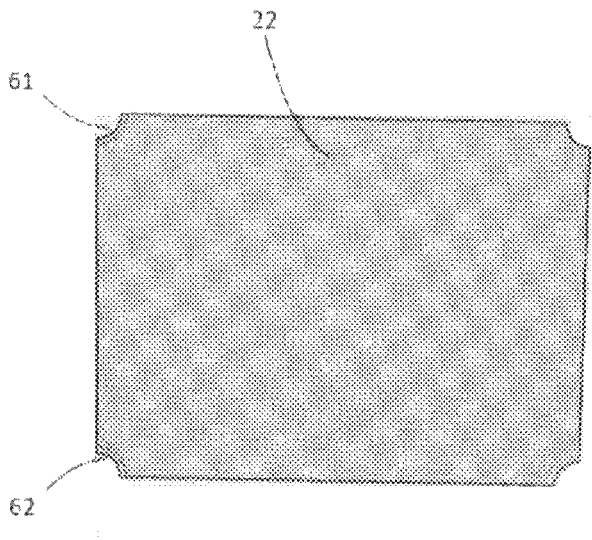
FIG. 6 illustrates the bottom view of the second conductive electrode of the surface-mounted polymer PTC overcurrent protection element having a small package size in Embodiment 4.

As illustrated in FIG. 6, the bottom view of the second conductive electrode 22 surface-mounted polymer PTC overcurrent protection element having a small package size of Embodiment 4 is is similar to the bottom view of the second conductive electrode 22 of Embodiment 3 in FIG. 5. In addition to Embodiment 3, first and second conductive members 61,62 are arranged at the two corners of the first conductive area of the PTC chip.

The design of double conductive members can improve the stability of the conductive members. When one of the conductive member is defective, the other conductive member can still conduct the first conductive area 211 of the first conductive electrode 21 and the second conductive electrode 22.

Embodiment 5

As illustrated in FIG. 7, the first conductive electrode 21' of the surface-mounted polymer PTC overcurrent protection element having a small package size of Embodiment 5 is another preferred scheme. In addition to Embodiment 1 to 4, there are graphic designs in use for the dividing gap 70' on the first conductive electrode 21'. Different from the graphic design of the straight-groove dividing gap in Embodiment 1, the graphic design of the dividing gap 70' is combined with arc and rectangular main portion which is still parallel to the longitudinal direction of the end electrodes. In Embodiment 5, the relative position and graphic of the dividing gap 70' determines the effective area of the first and second conductive area 211',212', and the the effective area of the second conductive area 212' determines the effective function part of the PTC overcurrent protection element. It can greatly improve design space of the product performance without relying on the formulation adjustment of PTC materials.

The summary and features of the present invention have been disclosed as previously mentioned. However, the present invention as mentioned above is only brief or only related to a specific part of the present invention. Inventive Alternatives and Modifications. The scope of protection of the invention should not be limited by what is disclosed in the embodiments, but should also include various substitutions and modifications that do not deviate from the invention.

What is claimed is:

1. A surface-mounted polymer PTC overcurrent protection element having a small package size, comprising:
   a first conductive electrode, a second conductive electrode, a PTC chip located between the first and second conductive electrodes, an insulating layer having a first layer side in contact with the first conductive electrode, a second layer side in contact with a first end electrode and a second end electrode,
   a dividing gap on the first conductive electrode to form first and second conductive areas, at least one conductive member arranged at an edge or at least a corner of the first conductive area for conducting the first conductive area and the second conductive electrode,
   wherein at least one portion in the dividing gap is parallel to the longitudinal direction of the first end electrode and the second end electrode, and wherein the dividing gap is filled with a resin material.

2. The surface-mounted polymer PTC overcurrent protection element of claim 1, wherein
   1) The PTC chip is composed of a PTC core material having a first surface covering the first conductive electrode and a second surface covering the second conductive electrode;
   2) the insulating layer is arranged between the first conductive electrode and the first and second end electrodes for electrical isolation, a first conductive connecting member arranged through one hole on the insulating layer and for electrical connection between the first end electrode and the first conductive area of the first conductive electrode, a second conductive connecting member arranged through another hole on the insulating layer for electrical connection between the second end electrode and the second conductive area of the first conductive electrode;
   3) the first end electrode is located at one end of the second layer side of the insulating layer, the second end electrode is located at the other end of the second layer side of the insulating layer.

3. A method of for preparing the surface-mounted polymer PTC overcurrent protection element of claim 2, comprising the following steps:
   step 1, preparation of the PTC chip: mixing a conductive polymer and conductive filler in a mixer to form a mixture, mixing the mixture at 100-200° C., and then using extrusion or compression molding to make a composite material base layer with an area of 100~5000 cm² and a thickness of 0.1~3.0 mm from the mixture, pressing the first and second conductive electrodes on first and second surfaces of the composite material base layer respectively by hot pressing to make a composite material sheet, processing the composite material sheet by γ-ray (Co60) or electron beam irradiation crosslinking with 2~100 Mrad dose, and then cutting the composite material sheet to obtain the PTC chip;
   step 2, etching or cutting the first conductive electrode to form the dividing gap and filling the dividing gap with an insulating material between the first conductive area and the second conductive area, wherein the first conductive area is larger than the area of the second conductive area;
   step 3, etching a groove and plating a metal to form the at least one conductive member at the edge or the corner of the first conductive area;
   step 4, covering the insulating layer on the first conductive electrode;
   step 5: setting the first and second end electrodes on the insulating layer in longitudinal parallel and making the main portion of the dividing gap to be parallel to the first and second end electrodes, drilling openings on the first and second end electrodes, arranging the first and second conductive connecting members through the openings and the insulating layer for making electrical connection between the first end electrode and the first conductive area between the second end electrode and the second conductive area of the first conductive electrode.

4. The method for preparing the surface-mounted polymer PTC overcurrent protection element having a small package size of claim 3, wherein in step 2, the dividing gap is a straight groove which is parallel to the end electrode, or an arc groove whose main portion is parallel to the end electrode.

5. The method for preparing the surface-mounted polymer PTC overcurrent protection element having a small package size of claim 3, wherein in step 3, the at least one conductive member is arranged at one end edge, one corner or two corners of the PTC chip.

6. The surface-mounted polymer PTC overcurrent protection element of claim 1, wherein the dividing gap is rectangular, triangular, arcuate, elliptical or polygonal.

7. The surface-mounted polymer PTC overcurrent protection element of claim 1, wherein insulating reinforcements are arranged at four corners, one end edge, two end edges or four end edges of the PTC chip.

8. The surface-mounted polymer PTC overcurrent protection element of claim 1, wherein the PTC overcurrent protection element is a single-side-soldering surface-mounted element.

\* \* \* \* \*